United States Patent
Goto et al.

(10) Patent No.: US 7,976,156 B2
(45) Date of Patent: Jul. 12, 2011

(54) WEARING-ORIENTATION SELECTABLE CONTACT LENS

(75) Inventors: Yuji Goto, Komaki (JP); Yukihisa Sakai, Toyohashi (JP); Hiroyuki Yamaguchi, Tajimi (JP)

(73) Assignee: Menicon Co., Ltd., Nagoya (JP)

( * ) Notice: Subject to any disclaimer, the term of this patent is extended or adjusted under 35 U.S.C. 154(b) by 0 days.

(21) Appl. No.: 12/824,623

(22) Filed: Jun. 28, 2010

(65) Prior Publication Data

US 2010/0259720 A1    Oct. 14, 2010

(51) Int. Cl.
*G02C 7/04* (2006.01)
(52) U.S. Cl. .......... 351/161; 351/177
(58) Field of Classification Search ........ 351/160 R, 351/160 H, 161, 177
See application file for complete search history.

(56) References Cited

U.S. PATENT DOCUMENTS

| | | | | |
|---|---|---|---|---|
| 4,268,133 A | * | 5/1981 | Fischer et al. | 351/161 |
| 4,618,228 A | * | 10/1986 | Baron et al. | 351/161 |
| 5,151,723 A | * | 9/1992 | Tajiri | 351/161 |
| 5,296,881 A | | 3/1994 | Freeman | |
| 5,422,687 A | * | 6/1995 | Tanaka et al. | 351/161 |
| 6,142,625 A | * | 11/2000 | Sawano et al. | 351/161 |
| 6,896,368 B2 | * | 5/2005 | Baugh | 351/161 |

FOREIGN PATENT DOCUMENTS

| | | |
|---|---|---|
| EP | 0 201 231 A2 | 11/1986 |
| JP | A-06-289329 | 10/1994 |

* cited by examiner

*Primary Examiner* — Scott J Sugarman
(74) *Attorney, Agent, or Firm* — Oliff & Berridge, PLC

(57) ABSTRACT

A wearing-orientation selectable contact lens including: an optical zone; a first diopter power region provided in the optical zone; and a second diopter power region having a lens power that is more positive than that of the first diopter power region. A superficial center of the second diopter power region is decentered on a symmetrical meridian from a geometric center of the optical zone. A circumferential positioning member is provided so as to selectively set up: a first stable state where the superficial center of the second diopter power region is positioned to one of left and right side of the eye, and a second stable state where the superficial center of the second diopter power region is positioned to another of left and right side of the eye. A visible indicator mark is provided for identifying a lens orientation of the first stable state and the second stable state.

10 Claims, 5 Drawing Sheets

WEARING-ORIENTATION SELECTABLE CONTACT LENS

INCORPORATION BY REFERENCE

The disclosure of Japanese Patent Application No. 2008-007114 filed on Jan. 16, 2008 including the specification, drawings and abstract is incorporated herein by reference in its entirety.

BACKGROUND OF THE INVENTION

1. Field of the Invention

The present invention relates to a contact lens, and relates in particular to a multifocal contact lens having a plurality of diopter power regions.

2. Description of the Related Art

It is commonly understood that in order to correct presbyopia, for example, multifocal contact lenses such as bifocal lenses will be prescribed. These lenses include a distance region provided as a first diopter power region and a near region provided as a second diopter power region having a more positive additional diopter power than that of the distance region.

For example, EP-A2-0201231 discloses such multifocal contact lenses with a configuration where a distance region and a near region are formed in a concentric pattern about a lens geometric center. On the other hand, it is known that the center of the pupil is slightly biased from the center of the cornea toward the nose. Consequently, with the configuration as taught in EP-A2-0201231, the two regions do not have an intended positional relationship with respect to the pupil during actual wear, because the distance region and the near region are formed in a concentric pattern about the lens geometric center on the assumption that the lens geometric center is to be aligned with the center of the pupil. As a result, it is not possible to afford an effective correction neither for distance vision nor for near vision.

Accordingly, in Japanese unexamined Patent Publication No. JP-A-6-289329, the Assignee proposed multifocal contact lenses wherein a near region is decentered from a lens geometric center toward the nose. With this arrangement, both the distance vision and the near vision can be effectively corrected by aligning the visual axis of the eye with the lens optical axis, being advantageously correspondent with the visual axis of the eye shifting toward the nose when looking at something near. However, the multifocal contact lenses disclosed in JP-A-6-289329 may have a near region being decentered not only in the lateral direction but also in the vertical direction of the wearer. Accordingly, it will be necessary to provide the lenses for use in the right eye and in the left eye individually, requiring additional specifications for the left and right eyes. Thus, if the lenses are supplied through made-to-stock production, a lot of stocks need to be prepared, posing a risk of increase in production cost or management cost.

A general problem with the multifocal contact lenses disclosed in EP-A2-0201231 or JP-A-6-289329 is that since the multifocal contact lens includes one optical region with a plurality of diopter power regions, each diopter power region has a narrow effective optical region. Consequently, optical characteristics are not as good as those of monofocal lenses. For example, many of the patients who now wear multifocal lenses for correction of presbyopia have corrected only distance vision with monofocal lenses so far. By using multifocal lenses, they become more satisfied with their near vision, whereas they are discontent with their distance vision compared to that by using monofocal lenses. In particular, during the night, their distance vision suffers from flare that occurs due to defocus of the near region, causing poor visibility. Thus, many of users of the multifocal lenses wear monofocal lenses when they drive or play sports at night, which obliges them to own both multifocal lenses and monofocal lenses for alternative use.

Another risk associated with the multifocal contact lenses is that correction may vary depending on changes in environment such as changes of brightness from day to night, or changes in usage such as changes from operating PC indoors to watching sports outdoors. Namely, when providing prescription for multifocal contact lenses, while the corrective diopter powers will be decided by an objective examination or a subjective examination, the corrective diopter power for near vision in particular is often decided with a great regard for the wearers' vision in the subjective examination. Here, in most cases, the multifocal contact lens will be prescribed indoors. Consequently, the multifocal contact lenses optimized under the environment at the time of prescription pose a risk that the wearers become less satisfied with their vision which changes under the different environment or usage conditions.

Furthermore, since multifocal contact lenses have a plurality of diopter powers to be adjusted, the prescription needs more time and labor than in case of monofocal lenses. Therefore, the multifocal contact lenses tend to be avoided by prescribers. Similarly, for the wearers, it takes time to get used to the multifocal contact lenses because of the unique vision thereof different from that of monofocal lenses.

An alternative method of correcting presbyopia is monovision prescription as disclosed in U.S. Pat. No. 5,296,881, for example. In monovision prescription, a contact lens adjusted for distance vision is adapted to be fitted to one eye while a contact lens adjusted for near vision is adapted to be fitted to the other eye. By so doing, the one eye will be given distance vision while the other eye will be given near vision. With this arrangement, it is possible to see the desired image by selecting from the image obtained through the distance vision and the image obtained through the near vision according to the action of wearers' brain. However, monovision prescription has not become widespread because of requirement of time and labor for prescription as well as difficulty in choice of lenses suitable for environment of usage.

SUMMARY OF THE INVENTION

It is therefore one object of the present invention to provide a contact lens of novel construction affording vision correction by each diopter power region more effectively.

The above and/or optional objects of this invention may be attained according to at least one of the following modes of the invention. The following modes and/or elements employed in each mode of the invention may be adopted at any possible optional combinations.

A first mode of the present invention provides a wearing-orientation selectable contact lens including: an optical zone situated in a lens center section; a first diopter power region provided in the optical zone; and a second diopter power region provided in the optical zone and having a lens power that is more positive than that of the first diopter power region, wherein the contact lens has a lens profile axisymmetric with respect to a symmetrical meridian defined by one of diametrical lines of the optical zone; wherein a superficial center of at least one of the first diopter power region and the second diopter power region is decentered on the symmetrical meridian from a geometric center of the optical zone; wherein a circumferential positioning member is provided so as to afford a stable position in a circumferential direction of the lens when worn in an eye where an orthogonal meridian that is orthogonal to the symmetrical meridian refers to a vertical direction of the eye; wherein the circumferential positioning member is adapted to selectively set up: a first stable state where the superficial center of the one of the first diopter power region and the second diopter power region, the one being decentered from the geometric center of the optical zone, is positioned to one of left and right side of the eye, and a second stable state where the superficial center of the one being decentered from the geometric center of the optical zone is positioned to another of left and right side of the eye; and wherein a visible indicator mark is provided for identifying a lens orientation of the first stable state and a lens orientation of the second stable state.

The wearing-orientation selectable contact lens constructed according to the present mode can be worn selectively either in the first stable state where the first diopter power is positioned on the side of the wearer's ear, or in the second stable state where the lens in the first stable state is vertically inverted and the first diopter power is positioned on the side of the wearer's nose. In the present mode, the lens diopter power of the second diopter power region that is more positive than that of the first diopter power region refers to greater diopter power towards the plus end. As a specific example, if the first diopter power region were −5 D, +1 D, 0 D, and −3 D would all have greater power towards the plus end.

Consequently, if for example the wearing-orientation selectable contact lens according to the present invention is designed as a bifocal lens for correcting presbyopia in which the first diopter power region serves as the distance optical zone and the second diopter power region serves as the near optical zone, the lens can be worn in the first stable state with the near optical zone positioned on the side of the wearer's nose, or in the second stable state with the near optical zone positioned on the side of the wearer's ear. Thus, if worn in the first stable state, the near optical zone is positioned on the side of the wearer's nose and overlaps the center of the pupil, so that correction of distance vision and near vision is possible. If worn in the second stable state on the other hand, the near optical zone is positioned on the side of the wearer's ear and is away from the center of the pupil, thereby affording good distance vision with reduced incidence of flare and the like. Specifically, according to the present mode, by changing the wearing state, it is possible to achieve at least one of: (1) change of the power of the lens optical face at the pupil center (preferably a power change of 0.25 D or greater); (2) change of positioning of the power of the lens optical zone on the pupil; and (3) change of the projected surface area ratio of the near optical zone and the distance optical zone on the pupil (preferably a change of projected surface area ratio of 10% or more). It is possible thereby to obtain bifocal effect through wear in the first stable state, and to obtain generally monofocal effect through wear in the second stable state, and to effectively produce the different optical characteristics of either.

Additionally, while it is not essential that the wearing-orientation selectable contact lens constructed according to the present mode be provided as a left/right set, providing the lenses in a left/right set affords better advantages. Specifically, the wearer may use the respective left and right lenses in selective combinations of the first stable state and the second stable state depending on the usage environment. In the case of the aforementioned bifocal lenses for example, if the wearing state where the near optical zone is positioned on the side of the nose is designated as a normal orientation while the wearing state where the near optical zone is positioned on the side of the ear is designated as a reversed orientation, both left and right lenses can be worn in the normal orientation to obtain bifocal effect from both lenses; or both left and right lenses can be worn in the reversed orientation to obtain generally monofocal effect from both lenses. The correction balance of distance vision and near vision may also be varied according to the usage environment, for example, by employing normal orientation for the dominant eye and reversed orientation for the non-dominant eye, or reversed orientation for the dominant eye and normal orientation for the non-dominant eye. By so doing the lenses can be used effectively for modified monovision prescriptions as well.

Through these combinations of lens stable states for left and right, the wearing-orientation selectable contact lens of the present mode reduces the time and effort required to habituate the wearer of bifocal lenses, for example. As a specific example, by establishing the first diopter power region as the distance optical zone and the second diopter power region as the near optical zone, and determining the distance power with the lenses in both eyes worn in the stable state in which the near optical zone is positioned on the side of the ear, a prescription for contact lenses for distance vision correction may be successfully accomplished. With regard to near power, by providing wearing-orientation selectable contact lenses constructed according to the present invention in a series having a given distance power and lens diopter power of the near optical zone that differs in small increments between lenses, and intended to be worn in the stable state with the near optical zone positioned on the side of the nose, by varying the near power gradually over periods ranging from several days to several months in the living environment to adequately habituate the wearer, it is possible to determine or establish an optimum level for near power.

In the wearing-orientation selectable contact lens constructed according to the present invention, in order to attain the two stable states, i.e. the first stable state and the second stable state, the wearer is supposed to select either the first stable state or the second stable state depending on the usage environment or condition. For this reason, according to the wearing-orientation selectable contact lens of the present invention, an indicator mark is provided so that circumferential positioning of the lens may be readily identified, facilitating wear of the lens in the desired state, namely in the first stable state or in the second stable state.

Furthermore, since the wearing-orientation selectable contact lens of construction according to the present invention has a symmetrical shape in the vertical direction when worn in the eye, as long as the distance vision and the near vision of the wearer are equal, it is possible to use the identical lenses regardless of whether they are for use in the left eye or in the right eye. Therefore, respective specifications for the left and right eyes are not necessary. Thus, where the lenses are provided through a made-to-stock production system for example, the level of inventory required conventionally can be halved, and the costs entailed in both production and administration can be reduced.

Whereas no particular limitation is imposed on the specific structure of the circumferential positioning member, it would be preferably acceptable to employ a second mode of the present invention that provides the wearing-orientation selectable contact lens according to the first mode further including a peripheral zone disposed to an outer peripheral side of the optical zone, wherein the circumferential positioning member comprises two slab-off zones provided on respective portions of the peripheral zone located at opposite sides of the optical zone in a direction of the orthogonal meridian; and the two slab-off zones have wall thickness made smaller than those of portions located at opposite sides of the optical zone in a direction of the symmetrical meridian. This arrangement is able to consistently assume both the first stable state and the second stable state where the lens in the first stable state is vertically inverted.

A third mode of the present invention provides the wearing-orientation selectable contact lens according to the first or second mode further including a peripheral zone disposed to an outer peripheral side of the optical zone, wherein the indicator mark is provided on the peripheral zone by at least one of dyeing and engraving. The wearing-orientation selectable contact lens constructed according to the present mode is provided with the indicator mark in the peripheral zone away from the optical zone, thereby preventing the indicator mark from affecting the optical characteristics. Thus, satisfactory optical characteristics are achieved in both the first and second stable states.

A forth mode of the present invention provides the wearing-orientation selectable contact lens according to any one of the first to third modes wherein the geometric center of the optical zone is coincident with a lens geometric center. According to this mode, deviation of the optical zone from the pupil can be avoided both in the first and second stable states, so that stable optical characteristics are achieved.

A fifth mode of the present invention provides the wearing-orientation selectable contact lens according to any one of the first to fourth modes wherein the superficial center of at least one of the first diopter power region and the second diopter power region is decentered from the geometric center of the optical zone by a distance of 0.4 mm or greater on the symmetrical meridian.

In the wearing-orientation selectable contact lens constructed according to the present mode, the position of the first diopter power region or the second diopter power region with respect to the center of the pupil differs unambiguously between the first stable state and the second stable state, making it possible to stably attain distinct optical characteristics. Specifically, if this decentered distance is smaller than 0.4 mm, the position of the first diopter power region or the second diopter power region is observed to change negligibly between the first stable state and the second stable state, making it difficult to attain obviously different optical characteristics.

A sixth mode of the present invention provides the wearing-orientation selectable contact lens according to any one of the first to fifth modes wherein, on a lens posterior surface adapted to be superposed on a cornea, a peripheral zone is disposed to an outer peripheral side of the optical zone, and an outside diameter dimension of the optical zone does not exceed 75% of an outside diameter dimension of the lens.

The wearing-orientation selectable contact lens constructed according to the present mode is able to consistently assume both the state where the first diopter power region is decentered from the center of the pupil and the state where the second diopter power region is decentered from the center of the pupil. Specifically, if the outside diameter dimension of the optical zone is greater than 75% of the lens outside diameter dimension, during wear the lens geometric center tends to stabilize at a fixed position on the cornea surface, and there is a risk of it becoming difficult for the lens to consistently assume the two stable states, i.e. the first stable state and the second stable state.

As a specific example, a seventh mode of the present invention provides the wearing-orientation selectable contact lens according to the sixth mode wherein the lens is a soft contact lens; and the outside diameter dimension of the optical zone of the lens posterior surface is 10 mm or less.

An eighth mode of the present invention provides the wearing-orientation selectable contact lens according to any one of the first to seventh modes wherein a power-added surface that imparts an additional lens power to the second diopter power region of the optical zone is provided on a lens posterior surface adapted to be superposed on a cornea during wear.

With the wearing-orientation selectable contact lens constructed according to the present mode, due to a difference in curvature between the first diopter power region and the second diopter power region, lacrimal fluid can be retained between the cornea surface and the lens posterior surface. By utilizing the retained lacrimal fluid as a lacrimal lens, abrupt change in optical characteristics between the first diopter power region and the second diopter power region can be mitigated. Also, by using a forming die to shape the profile of the lens posterior surface having multiple curvature ratios that differ for the first diopter power region and the second diopter power region, excellent manufacturing efficiency may be achieved.

A ninth mode of the present invention provides the wearing-orientation selectable contact lens according to any one of the second to eighth modes wherein the lens is a soft contact lens; and the two slab-off zones are provided on a lens posterior surface adapted to be superposed on a cornea during wear.

With the wearing-orientation selectable contact lens constructed according to the present mode, through deformation of the lens to conform with the cornea surface when worn against the eye, the two slab-off zones formed on the lens posterior surface appear on the lens anterior surface. Thus, the lens can be positioned in the first stable state and the second stable state through interaction with the eyelid. The present mode is preferably employed in conjunction with the preceding eighth mode. Specifically, by forming the power-added surface and the slab-off zones on the lens posterior surface, it is possible to use a forming die to form the complex profile of the lens posterior surface, and excellent manufacturing efficiency may be achieved.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
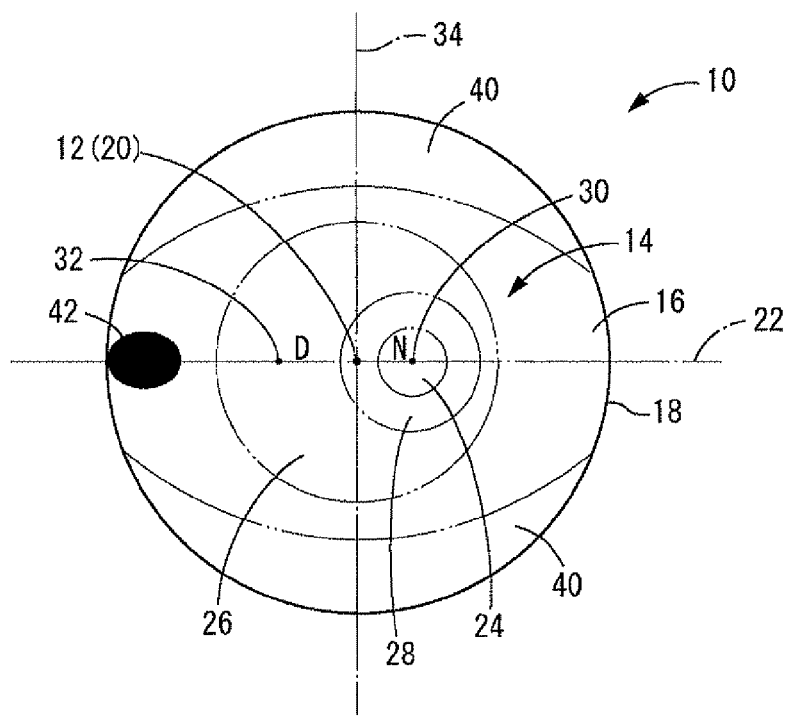
FIG. 1 is a front view of a contact lens according to a first embodiment of the present invention.

First, FIG. 1 depicts a contact lens 10 as a wearing-orientation selectable contact lens according to a first embodiment of the present invention. As seen in front view depicted in FIG. 1, the contact lens 10 is approximately spherical shell shaped overall having the profile of a solid of revolution defined by rotation about a lens geometric center axis 12. The contact lens 10 is adapted to be worn superimposed on the surface of the cornea of the eye. In FIG. 1 and FIGS. 3A through 7 described later, the symbols "N" and "D" denote the locations of the near optical zone and the distance optical zone respectively for convenience' sake.

The contact lens 10 according to the present embodiment is a contact lens of soft type, material for which is not limited in any particular way. For example, conventional known hydrated materials such as PHEMA (polyhydroxyethyl methacrylate), PVP (polyvinyl pyrrolidone), or non-hydrated materials such as acrylic rubber, silicone could be used.

The contact lens 10 is a lens of simultaneous vision type for correction of presbyopia, and as seen in depicted front view, an optical zone 14 serving as a corrective optical system is formed with large circular shape extending about a lens geometric center axis 12. In the outer peripheral portion of the lens 10 there is formed a peripheral zone 16 serving as a non-optical region so as to encircle the optical zone 14. The peripheral zone 16 has a shape of an annular band with a prescribed width and is formed about the lens geometric center axis 12. Moreover, in the outer peripheral edge of the lens 10 there is formed an edge portion 18 of annular shape extending about the entire circumference. The edge portion 18 smoothly connects the anterior and posterior surfaces of the soft contact lens 10.

In the optical zone 14, an optical zone geometric center axis 20 is coincident with the lens geometric center axis 12. Additionally, the outside diameter dimension of the optical zone 14 at the lens posterior surface does not exceed 75% of the outside diameter dimension of the lens 10, and will preferably be 10 mmφ or less, which is equal or smaller than an average of the diameter of the human cornea. The reason is that if the outside diameter dimension of the optical zone 14 exceeds 75% of the outside diameter dimension of the lens 10, the lens tends to stabilize at a fixed position, making it difficult to afford two stable states described later, namely the first stable state and the second stable state.

Furthermore, the optical zone 14 is composed of optical regions having three different focal lengths. First, a near optical zone 24 is defined by a small circular region whose superficial center is decentered from the optical zone geometric center axis 20 on a symmetrical meridian 22 defined by one of diametrical lines of the optical zone 14. The near optical zone 24 has a certain focal length (namely, lens power) for near vision. Second, a distance optical zone 26 is defined by an outermost peripheral region of the optical zone 14 that encircles the near optical zone 24. The distance optical zone 26 has a certain focal length (lens power) for distance vision. Third, a transition zone 28 is defined by the region between the near optical zone 24 and the distance optical zone 26, which takes the form of an annular band.

The near optical zone 24 defines a lens surface in which the lens power of the distance optical zone 26 has an additional prescribed add power for the purpose of near vision. With this arrangement, the lens power of the near optical zone 24 is more positive than that of the distance optical zone 26. In the present embodiment, the distance optical zone 26 serves as a first diopter power region while the near optical zone 24 serves as a second diopter power region. Meanwhile, in the transition zone 28, the focal length (lens power) changes progressively from the lens power of the near optical zone 24 to that of the distance optical zone 26 in the radial direction. The transition zone 28 may alternatively have, for example, a predetermined focal length (lens power) between that of the near optical zone 24 and that of the distance optical zone 26.

It should be appreciated that a near zone superficial center 30, which represents the superficial center of the near optical zone 24, is decentered on the symmetrical meridian 22 of the optical zone 14 from the optical zone geometric center axis 20. In preferred practice, the near zone superficial center 30 is decentered from the optical zone geometric center axis 20 by a distance of 0.4 mm or greater, more preferably 0.6 mm or greater, as measured by a component of the direction of the symmetrical meridian 22, i.e., on the symmetrical meridian 22. The reason is that if the decenter distance is less than 0.4 mm, it becomes difficult to produce a differential in tams of the relative position of the near optical zone 24 with respect to the pupil, between the first stable state and in the second stable state (described later). Meanwhile, a distance zone superficial center 32, which represents the superficial center of the distance optical zone 26, is decentered on the symmetrical meridian 22 to the opposite side of the near zone superficial center 30 with the optical zone geometric center axis 20 being interposed therebetween. Accordingly, the optical zone 14 is imparted with symmetrical shape in relation to the symmetrical meridian 22, and with asymmetrical shape in relation to an orthogonal meridian 34 that is orthogonal to the symmetrical meridian 22 on the lens geometric center axis 12.

Figure 2:
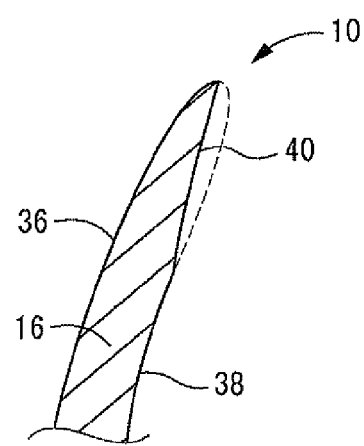
FIG. 2 is a model depiction of a fragmentary cross section of the contact lens of FIG. 1 in a direction of an orthogonal meridian.

Moreover, a power-added surface that imparts the additional lens power to the near optical zone 24 is provided to the lens posterior surface adapted to be superposed on the cornea during wear. In the present embodiment, the optical zone 14 includes: a lens anterior surface 36 having a convex arcuate cross section of generally constant curvature radius (see FIG. 2); and a lens posterior surface 38 having a convex arcuate cross section (see FIG. 2) and imparting the lens power to the near optical zone 24 and the distance optical zone 26 in cooperation with the lens anterior surface 36. With this arrangement, the contact lens 10 according to the present embodiment is able to retain lacrimal fluid between the cornea surface and the lens posterior surface 38 during the wear on the eye. The lacrimal lens formed by the lacrimal fluid will reduce abrupt change in lens power between the near optical zone 24 and the distance optical zone 26.

Furthermore, in the peripheral zone 16, slab-off zones 40, 40 are provided on either side of the optical zone 14 in the direction of the orthogonal meridian 34. The slab-off zones 40, 40 have wall thickness made smaller than those of portions located at opposite sides of the optical zone 14 in the direction of the symmetrical meridian 22. The two slab-off zones 40, 40 constitute double slab-off design serving as a circumferential positioning member. As depicted in model form in FIG. 2, in the present embodiment in particular, the two slab-off zones 40, 40 are provided on the lens posterior surface 38. When worn in an eye, the contact lens 10 experiences deformation so as to conform to the cornea surface, thus causing the contours of the two slab-off zones 40, 40 established on the lens posterior surface 38 to appear on the lens anterior surface 36. The two slab-off zones 40, 40 are axisymmetric with respect to the orthogonal meridian 34 as well as to the symmetrical meridian 22.

With this arrangement, the contact lens 10 according to the present embodiment inclusive of the optical zone 14 and the peripheral zone 16 has an axisymmetric profile overall with respect to the symmetrical meridian 22, while being non-axisymmetric with respect to the orthogonal meridian 34 since the near optical zone 24 is decentered from the lens geometric center axis 12.

Additionally, a visible indicator mark 42 is provided at the circumferential appropriate location on the peripheral zone 16. The indicator mark 42 is provided for the purpose of visually identifying the circumferential orientation of the contact lens 10 and in preferred practice formed in the outer peripheral edge of the lens 10 on the symmetrical meridian 22 and/or on the orthogonal meridian 34. It is possible to provide the indicator mark 42 using methods known in the conventional art; dyeing or engraving will be favorably employed. Also, no particular limitation is imposed as to the appearance of the indicator mark 42 and various different designs or alphanumeric characters, or the like could be used.

Owing to the interaction between the slab-off zone 40,40 and the eyelid, the contact lens 10 constructed as described above, when worn in the eye, will be stable in the circumferential direction at a position where the orthogonal meridian 34 refers to the vertical direction of the eye. Here, with respect to the contact lens 10 in the present embodiment, the near optical zone 24 is decentered from the optical zone geometric center axis 20. Accordingly, by vertically inverting the lens 10, it is possible to selectively set up two stable states: the first stable state (the state as seen in front view depicted in FIG. 1) where the near zone superficial center 30 of the near optical zone 24 is decentered to the right side as seen in front view; and the second stable state where the near zone superficial center 30 of the near optical zone 24 is decentered to the left side as seen in front view.

With this arrangement, when wearing the contact lens 10 according to the present embodiment in the right eye, for example, in the first stable state, the near optical zone 24 is positioned on the side of the nose. Consequently, the near optical zone 24 will overlap the center of the pupil, thereby obtaining effect of a bifocal lens that is capable of correcting both the near vision and the distance vision. On the other hand, when wearing the lens 10 in the right eye in the second stable state, namely the state where the lens 10 in the first stable state is vertically inverted, the near optical zone 24 is positioned on the side of the ear. Consequently, the near optical zone 24 will be away from the center of the pupil, thereby obtaining distance vision substantially similar to that of a monofocal lens. At this point, in the present embodiment, the indicator mark 42 provided on the peripheral zone 16 makes it possible to visually identify the circumferential orientation of the lens 10. Accordingly, the wearer can easily select the first stable state and the second stable state.

While it is not essential for the contact lens 10 according to the present embodiment to be provided as a left/right pair, by providing the lenses as a left/right pair, more excellent vision correction can be afforded. Specifically, by using the lenses in combinations of the first stable state and the second stable state in both left and right eyes respectively, it is possible to obtain an appropriate vision correction depending on the usage conditions.

Figure 3A:
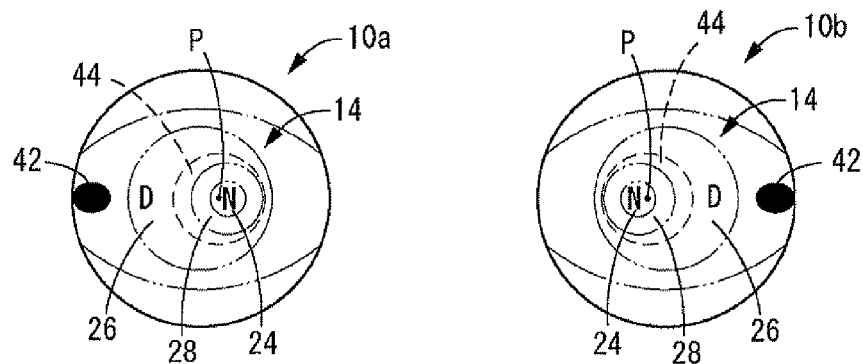
FIGS. 3A-3C are illustrations depicting examples of wearing combinations of the contact lenses of FIG. 1.
Figure 3B:
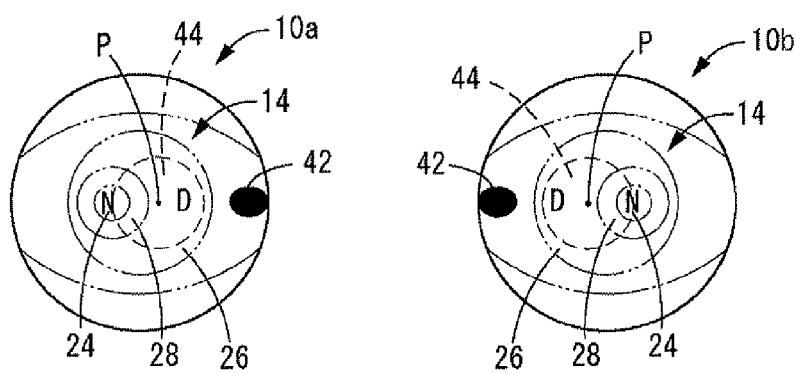
Figure 3C:
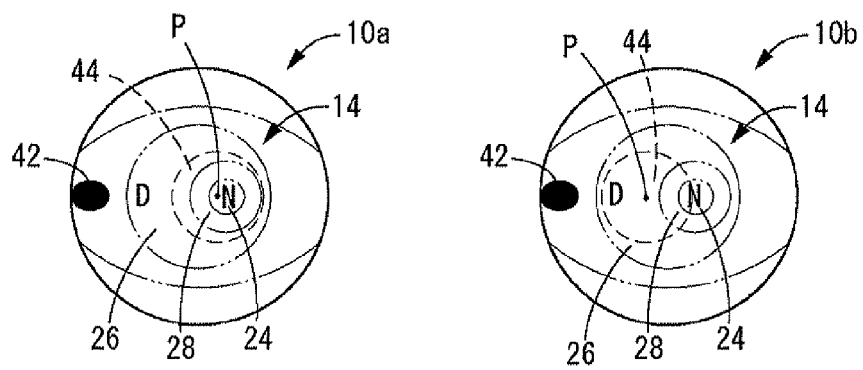

FIGS. 3A through 3C depict examples of combination of contact lenses 10 when worn in the left and right eyes. FIGS. 3A through 3C each shows a front view, and the contact lens 10 constructed as described above is worn in each eye. In the following description, a contact lens 10a refers to the lens worn in the right eye (the left lens in FIGS. 3A-3C) and a contact lens 10b refers to the lens worn in the left eye (the right lens in FIGS. 3A-3C).

In the following description, in each left and right eye, a normal orientation refers to the stable state where the near optical zone 24 is positioned on the side of the nose while a reversed orientation refers to the stable state where the near optical zone 24 is positioned on the side of the ear. Therefore, if the first stable state denotes the state where the near optical zone 24 is positioned to the right side of the eye as seen in front view, the normal orientation refers to the state where the right eye wears the lens 10 in the first stable state (the near optical zone 24 is positioned to the right side of the eye as seen in front view) and the left eye wears the lens 10 in the second stable state (the near optical zone 24 is positioned to the left side of the eye as seen in front view). Additionally, in the normal orientation the indicator mark 42 is adapted to be on the side of the ear while in the reverse orientation the indicator mark 42 is adapted to be on the side of the nose. This makes it possible to visually identify the stable state of the lens 10.

First, in FIG. 3A, both of the contact lenses 10a, 10b are worn in the normal orientation in both the right and left eyes. By so doing, in each eye, the near optical zone 24 overlaps the center: P of the pupil 44 thereby obtaining a bifocal effect where correction is well balanced for distance and near vision. In this embodiment in particular, in the normal orientation, the near optical zone 24 is decentered toward the nose, thereby being advantageously correspondent with the center of the pupil shifting toward the nose when looking at something near. Accordingly, more effective bifocal effect will be attained. Second, in FIG. 3B, both of the contact lenses 10a, 10b are worn in the reversed orientation in both the right and left eyes. By so doing, in each eye, the near optical zone 24 is away from the center: P of the pupil 44 thereby obtaining an effect comparable to that of a monofocal lens owing to the distance optical zone 26 as well as a modicum correction effect for near vision. Moreover, the occurrence of flare can be reduced considerably, making the lenses suitable for wear during night driving for example. Third, in FIG. 3C, the contact lens 10a is worn in the normal orientation in the right eye while the contact lens 10b is worn in the reversed orientation in the left eye. By so doing, the right eye will obtain the distance vision as well as the near vision by the near optical zone 24 overlapping the center: P of the pupil 44, while the left eye will obtain correction for distance vision comparable to that of a monofocal lens by the near optical zone 24 being away from the center: P of the pupil 44. Consequently, the lenses can favorably be used for prescribing modified monovision.

As will be understood from the above description, the contact lens 10 according to the present embodiment is able to afford vision corrections appropriate for respective usage conditions by employing the first stable state and the second stable state in various combinations for the left and right eyes. Furthermore, in the present embodiment, since the lens 10 has a lens profile axisymmetric with respect to the symmetrical meridian 22, as long as the distance vision and the near vision of the wearer are equal, it is possible to prescribe the identical lenses regardless of whether they are for use in the left eye or in the right eye. Therefore, it is not necessary to prepare the lenses individually for the left and right eyes. Accordingly, the amount of stock can be reduced in the case of, for example, supplying a lot of lenses with specifications adapted to be used for made-to-stock production. The labor for prescription will also be reduced.

Figure 4:
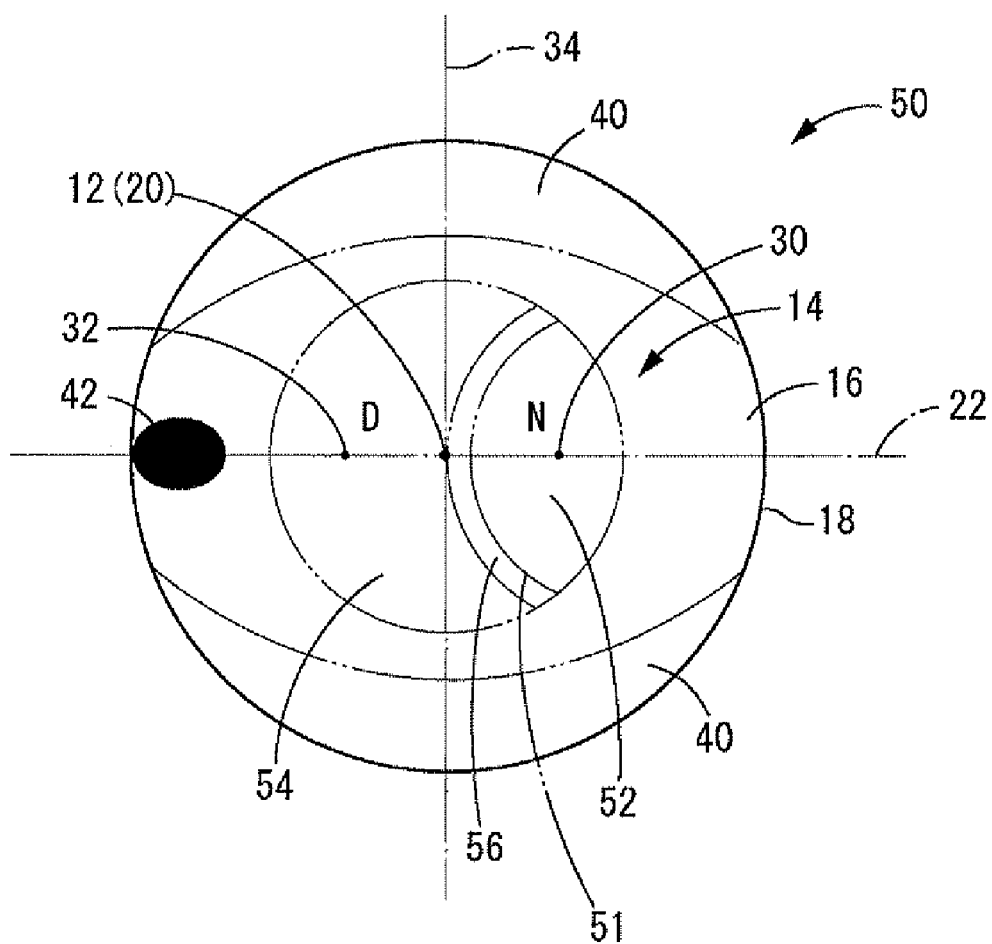
FIG. 4 is a front view of a contact lens according to a second embodiment of the present invention.

FIG. 4 depicts a contact lens 50 as a wearing-orientation selectable contact lens according to a second embodiment of the present invention. In the description following, elements like those in the first embodiment shall be designated by like reference numerals and will not be discussed in detail.

The contact lens 50 is a contact lens of simultaneous vision type similar to the contact lens 10 of the first embodiment but has the optical zone 14 of different profile therefrom. Specifically, in the optical zone 14 of circular shape, a near optical zone 52 is formed on one side of an arcuate boundary 51 (in the present embodiment, the side of smaller area) and a distance optical zone 54 is formed on the other side of the boundary 51 (in the present embodiment, the side of larger area). The boundary 51 has a curvature radius substantially equal to that of the optical zone 14 and a size such that it does not extend as far as the optical zone geometric center axis 20. Additionally, a transition zone 56 joining the near optical zone 52 and the distance optical zone 54 is formed therebetween. As in the first embodiment, the near zone superficial center 30 that represents the superficial center of the near optical zone 52 is positioned decentered from the optical zone geometric center axis 20 on the symmetrical meridian 22. Similarly, the distance zone superficial center 32 that represents the superficial center of the distance optical zone 54 is positioned decentered from the optical zone geometric center axis 20 as in the first embodiment.

With this arrangement, the optical zone 14 is axisymmetric in shape with respect to the symmetrical meridian 22 but is non-axisymmetric with respect to the orthogonal meridian 34 that is orthogonal to the symmetrical meridian 22 on the lens geometric center axis 12.

Figure 5A:
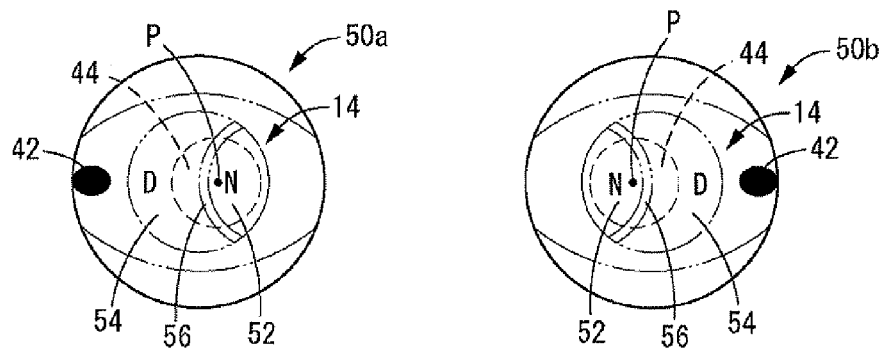
FIGS. 5A-5C are illustrations depicting examples of wearing combinations of the contact lenses of FIG. 4.
Figure 5B:
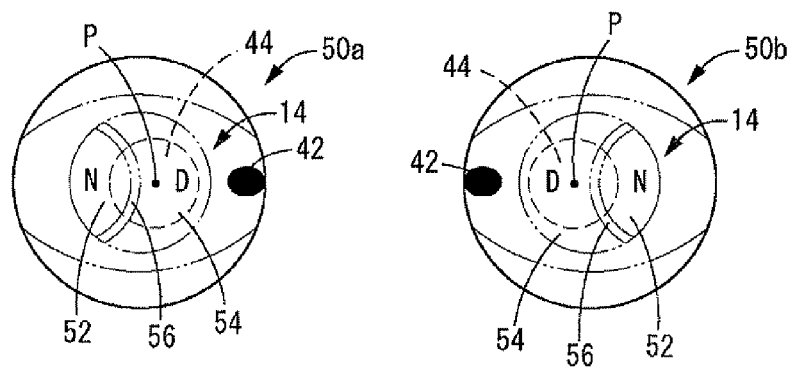
Figure 5C:
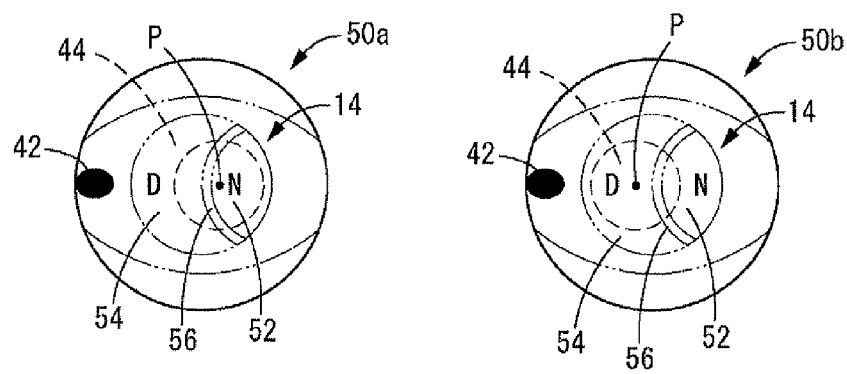

As depicted in FIGS. 5A through 5C, with the contact lens 50 according to the present embodiment as well, by employing the normal orientation and the reversed orientation in various combinations in left and right eyes respectively, vision correction can be optimized according to usage conditions. While a detailed description will not be made herein since FIGS. 5A-5C correspond to above-described FIGS. 3A-3C, if both of the contact lenses 50a, 50b are worn in the normal orientation in the respective right and left eyes as depicted in FIG. 5A, bifocal effect is achieved; whereas if both of the contact lenses 50a, 50b are worn in the reversed orientation in the respective right and left eyes as depicted in FIG. 5B, distance vision correction comparable to a monofocal lens is achieved. It is additionally possible, for example, to wear the contact lens 50a in the normal orientation in the right eye and wear the contact lens 50b in the reversed orientation in the left eye as depicted in FIG. 5C. The lenses are thus suited for use in modified monovision prescriptions.

As will be apparent from the present embodiment, the first diopter power region (the distance optical zone 54 in the present embodiment) and the second diopter power region (the near optical zone 52 in the present embodiment) formed in the optical zone are not necessarily have a circular profile.

Figure 6:
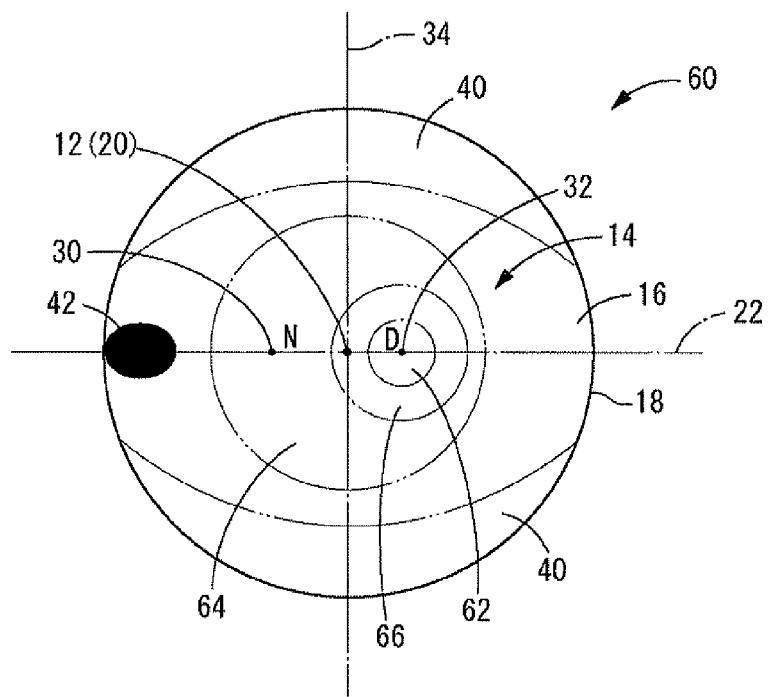
FIG. 6 is a front view of a contact lens according to a third embodiment of the present invention.

Next, FIG. 6 depicts a contact lens 60 as a wearing-orientation selectable contact lens according to a third embodiment of the present invention. The near optical zone 24 and the distance optical zone 26 of the contact lens 10 according to the first embodiment described previously have been transferred, with equivalent contours in front view, to the contact lens 60, while exchanging the diopter powers thereof. Namely, in the present embodiment, a near optical zone 64 encircles a distance optical zone 62 of small circular shape in front view, and a transition zone 66 is formed between the distance optical zone 62 and the near optical zone 64. From the present embodiment it will be appreciated that the area ratio of the first diopter power region (the distance optical zone 62 in the present embodiment) and the second diopter power region (the near optical zone 64 in the present embodiment) is not limited in any way. Either the first or the second diopter power region may be large or small. The first and second diopter power regions may have equal area as well.

Figure 7:
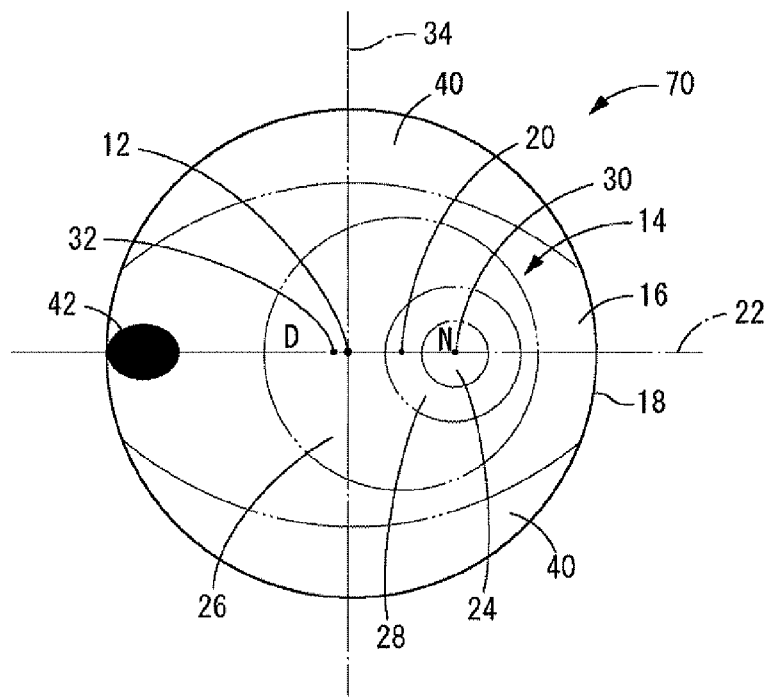
FIG. 7 is a front view of a contact lens according to a fourth embodiment of the present invention.

Next, FIG. 7 depicts a contact lens 70 as a wearing-orientation selectable contact lens according to a fourth embodiment of the present invention. In the present embodiment, the optical zone geometric center axis 20 is positioned decentered from the lens geometric center axis 12 on the symmetrical meridian 22. The optical zone 14 may be positioned decentered from the lens geometric center axis 12 in this way, to an extent such that no problems are encountered during wear.

While the present invention has been shown above through certain preferred embodiments, these are merely illustrative and should not be construed as limiting the invention in any way to the specific disclosure in the embodiments.

For example, the present invention is applicable to bifocal lenses having two focal points, to multifocal lenses having more than two focal points, and to progressive multi-focal lenses. In addition, the lens does not require a distinct boundary between the first diopter power region and the second diopter power region. In the case with a progressive multi-focal lens for example, for a median value lying between the maximum value and minimum value of lens diopter power, the region of smaller power than this median value constitutes the first diopter power region, and the region of greater power constitutes the second diopter power region. Accordingly, the present invention is not applicable exclusively to near/distance lenses for correcting presbyopia. By giving a lens a small power differential between the first diopter power region and the second diopter power region on the order of 0.25 D for example, it would be possible to provide a lens for use indoors in normal orientation, and for use outdoors in reversed orientation.

The decentered position of the superficial center of the first diopter power region or the second diopter power region is not strictly limited to one lying on the diametrical line, and a modicum of deviation from the diametrical line is permissible.

Moreover, the present invention is not limited to application in soft contact lenses, and is of course applicable to hard contact lenses.

Results of tests carried out for the purpose of demonstrating vision correction by the first stable state and vision correction by the second stable state of wearing-orientation selectable contact lenses constructed according to the present invention are presented below.

First, wearing-orientation selectable contact lenses according to the structure taught in the present invention were prepared for three human test subjects. All lenses were soft contact lenses having outside diameter dimension (DIA) of 14.5 mm, a base curve (B.C.) of 8.60 mm, a posterior surface optical zone diameter of 10.0 mm, a decenter distance between the geometric center of the near optical zone and the lens geometric center of 2.0 mm, a center thickness of 0.10 mm, a thickness in thicker portions in the peripheral zone of 0.40 mm, a thickness in thin portions in the peripheral zone of 0.13 mm, and water content of 72%. In the peripheral zone, the indicator mark was formed by a blue tinted circular shape having diameter dimension of 1.5 mmφ.

TABLE 1

| | | | | CL power used | |
| --- | --- | --- | --- | --- | --- |
| Subject | Age (years) | Accommodation ability (D) | Target eye (R/L) | Distance power (D) | Add power (D) |
| A | 44 | 4.0 | R | −3.00 | +1.50 |
| | | | L | −2.25 | +1.50 |
| B | 49 | 2.5 | R | −4.00 | +1.50 |
| | | | L | −4.50 | +1.50 |
| C | 53 | 2.3 | R | −3.75 | +1.50 |
| | | | L | −2.50 | +1.50 |

The soft contact lenses described above were imparted with the distance power indicated in Table 1 to provide the three test subjects with distance vision correction in both left and right eyes; all lenses were also imparted with uniform +1.5 D add power. The accommodation ability value in Table 1 represents the accommodation range from the far point of accommodation (the conjugate point on the retina at relaxed accommodation) to the near point of accommodation (the conjugate point on the retina at maximum strain of accommodation), expressed in terms of refractive index of the lens.

TABLE 2

| Subject | Age (years) | Accommodation ability (D) | Normal orientation in both eyes | | Reversed orientation in both eyes | |
|---|---|---|---|---|---|---|
| | | | Distance vision | Near vision | Distance vision | Near vision |
| A | 44 | 4.0 | 7 | 10 | 9 | 8 |
| B | 49 | 2.5 | 10 | 8 | 10 | 4 |
| C | 53 | 2.3 | 9 | 6 | 10 | 0 |
| Ave. | 48.7 | 2.9 | 8.7 | 8.0 | 9.7 | 4.0 |

Evaluations based on self-reported impressions by each test subject in relation to distance vision and near vision while wearing the wearing-orientation selectable contact lens according to the structure taught in the present invention in the normal orientation (corresponding to FIG. 3A) in both eyes, and when wearing them in the reversed orientation (corresponding to FIG. 3B) in both eyes, respectively, are given in Table 2. Vision was evaluated in 11 levels of 0 to 10, with 10 being the best.

From Table 2 it will be appreciated that when the lens was worn in both eyes in the normal orientation, each test subject affords near vision correction; and correction is well balanced for distance and near vision. When the lens was worn in both eyes in the reversed orientation, each test subject affords weaker near vision correction (and some test subjects afford stronger distance vision correction as well), demonstrating distance vision correction generally comparable to a monofocal lens.

TABLE 3

| Subject | Age (years) | Accommodation ability (D) | Normal orientation in both eyes | Reversed orientation in both eyes |
|---|---|---|---|---|
| A | 44 | 4.0 | 1.34 | 0.58 |
| B | 49 | 2.5 | 1.69 | 0.20 |
| C | 53 | 2.3 | 0.68 | −0.16 |
| Ave. | 48.7 | 2.9 | 1.2 | 0.2 |

Measurements of add power obtained during lens wear when the lenses were worn in both eyes in the normal orientation (corresponding to FIG. 3A), and when worn in both eyes in the reversed orientation (corresponding to FIG. 3B), respectively, are given in Table 3. From Table 3 it will be appreciated that the lens worn in the normal orientation affords higher add power, i.e. effective near vision correction. When the lens is worn in the reversed orientation, near vision correction is weaker, demonstrating distance vision correction generally comparable to a monofocal lens.

What is claimed is:

1. A wearing-orientation selectable contact lens comprising:
    an optical zone situated in a lens center section;
    a first diopter power region provided in the optical zone; and
    a second diopter power region provided in the optical zone and having a lens power that is more positive than that of the first diopter power region,
    wherein the contact lens has a lens profile axisymmetric with respect to a symmetrical meridian defined by one of diametrical lines of the optical zone;
    wherein a superficial center of at least one of the first diopter power region and the second diopter power region is decentered on the symmetrical meridian from a geometric center of the optical zone;
    wherein a circumferential positioning member is provided so as to afford a stable position in a circumferential direction of the lens when worn in an eye where an orthogonal meridian that is orthogonal to the symmetrical meridian refers to a vertical direction of the eye;
    wherein the circumferential positioning member is adapted to selectively set up:
        a first stable state where the superficial center of the one of the first diopter power region and the second diopter power region, the one being decentered from the geometric center of the optical zone, is positioned to one of left and right side of the eye, and
        a second stable state where the superficial center of the one being decentered from the geometric center of the optical zone is positioned to another of left and right side of the eye; and
    wherein a visible indicator mark is provided for identifying a lens orientation of the first stable state and a lens orientation of the second stable state.

2. The wearing-orientation selectable contact lens according to claim 1, further comprising a peripheral zone disposed to an outer peripheral side of the optical zone, wherein the circumferential positioning member comprises two slab-off zones provided on respective portions of the peripheral zone located at opposite sides of the optical zone in a direction of the orthogonal meridian; and the two slab-off zones have wall thickness made smaller than those of portions located at opposite sides of the optical zone in a direction of the symmetrical meridian.

3. The wearing-orientation selectable contact lens according to claim 1, further comprising a peripheral zone disposed to an outer peripheral side of the optical zone, wherein the indicator mark is provided on the peripheral zone by at least one of dyeing and engraving.

4. The wearing-orientation selectable contact lens according to claim 1, wherein the geometric center of the optical zone is coincident with a lens geometric center.

5. The wearing-orientation selectable contact lens according to claim 1, wherein the superficial center of at least one of the first diopter power region and the second diopter power region is decentered from the geometric center of the optical zone by a distance of 0.4 mm or greater on the symmetrical meridian.

6. The wearing-orientation selectable contact lens according to claim 1, wherein, on a lens posterior surface adapted to be superposed on a cornea, a peripheral zone is disposed to an outer peripheral side of the optical zone, and an outside diameter dimension of the optical zone does not exceed 75% of an outside diameter dimension of the lens.

7. The wearing-orientation selectable contact lens according to claim 6, wherein the lens is a soft contact lens; and the outside diameter dimension of the optical zone of the lens posterior surface is 10 mm or less.

8. The wearing-orientation selectable contact lens according to claim 1, wherein a power-added surface that imparts an additional lens power to the second diopter power region of the optical zone is provided on a lens posterior surface adapted to be superposed on a cornea during wear.

9. The wearing-orientation selectable contact lens according to claim 2, wherein the lens is a soft contact lens; and the two slab-off zones are provided on a lens posterior surface adapted to be superposed on a cornea during wear.

10. The wearing-orientation selectable contact lens according to claim 1, wherein the first stable state and the second stable state are selectively set up by vertically inverting the lens.

* * * * *